US 6,928,449 B2

(12) United States Patent
Ten-Hove et al.

(10) Patent No.: US 6,928,449 B2
(45) Date of Patent: Aug. 9, 2005

(54) MECHANISM FOR FACILITATING BACKTRACKING

(75) Inventors: Ronald A. Ten-Hove, Albany, CA (US); Matthew D. Birder, San Francisco, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 621 days.

(21) Appl. No.: 10/033,521

(22) Filed: Oct. 18, 2001

(65) Prior Publication Data

US 2003/0078906 A1 Apr. 24, 2003

(51) Int. Cl.[7] .............................................. G06F 17/00
(52) U.S. Cl. ...................... 707/102; 715/513; 717/131
(58) Field of Search ................................ 707/100, 101, 707/102; 715/513, 501.1; 717/124, 126, 127, 128, 129, 131

(56) References Cited

U.S. PATENT DOCUMENTS

| | | | |
|---|---|---|---|
| 5,533,192 A | | 7/1996 | Hawley et al. |
| 5,640,576 A | * | 6/1997 | Kobayashi et al. ............ 704/9 |
| 5,754,759 A | * | 5/1998 | Clarke et al. .................. 714/37 |
| 5,794,047 A | | 8/1998 | Meier |
| 5,819,093 A | | 10/1998 | Davidson et al. |
| 5,854,925 A | * | 12/1998 | Shimomura .................. 717/128 |
| 5,870,607 A | * | 2/1999 | Netzer ......................... 717/127 |
| 6,042,614 A | | 3/2000 | Davidson et al. |
| 6,125,375 A | * | 9/2000 | Atkins et al. ................ 715/502 |
| 6,253,317 B1 | | 6/2001 | Knapp, III et al. |
| 6,418,450 B2 | * | 7/2002 | Daudenarde ................. 707/200 |
| 6,480,818 B1 | | 11/2002 | Alverson et al. |
| 6,507,847 B1 | * | 1/2003 | Fleischman ................. 707/101 |
| 6,665,710 B1 | * | 12/2003 | Bates et al. .................. 709/217 |
| 6,668,369 B1 | | 12/2003 | Krebs et al. |
| 2002/0073119 A1 | * | 6/2002 | Richard ....................... 707/513 |
| 2002/0120918 A1 | | 8/2002 | Aizenbud-Reshef et al. |
| 2002/0120919 A1 | | 8/2002 | Aizenbud-Reshef et al. |
| 2002/0169842 A1 | * | 11/2002 | Christensen et al. ........ 709/206 |
| 2003/0078906 A1 | | 4/2003 | Ten-Hove et al. |

OTHER PUBLICATIONS

Bahlke et al, "A Generator for Language–Specific Debugging Systems", ACM 1987, pp. 92–101.*
Francel et al, "Fault Localization Using Execution Traces", ACM 1992, pp. 69–76.*
Ducasse, "Coca: An automated Debugger for C", ACM 1999, pp. 504–513.*
Wilson et al, "Demonic Memory for Process Histories", ACM 1989, pp. 330–343.*
Yoon et al, "Cognitive Activities and Support in Debugging", IEEE 1998, pp. 160–169.*
Agrawal et al, "An Execution–Backtracking Approach to Debugging", IEEE 1991, pp. 21–26.*
"Stylus Studio, Main Page," http://198.77.237.242/default.asp, printed Jan. 16, 2002, 1 page.
"Stylus Studio, Features," http://198.77.237.242/productinfo.asp, printed Jan. 16, 2002, 1 page.
"Stylus Studio, XSLT and Java Debugger," http://198.77.237.242/productinfo.asp?page=6, printed Jan. 16, 2002, 1 page.

* cited by examiner

Primary Examiner—Uyen Le
(74) Attorney, Agent, or Firm—Hickman, Palermo, Truong & Becker, LLP (57) ABSTRACT

In processing a source entity with a transformation entity, an action set forth in a portion of the transformation entity is executed. A portion of the source entity is the subject of this action. This action causes a particular portion of a result entity to be generated. After this portion of the result entity is generated, a set of history information is associated therewith, which comprises a reference to the portion of the transformation entity that gave rise to the action, and a reference to the portion of the source entity that was the subject of the action. Given this information, it is possible to perform backtracking at a later time, so that when this particular portion of the result entity is selected, those portions of the transformation and source entities that gave rise to the particular portion of the result entity can be indicated to a user.

45 Claims, 5 Drawing Sheets

```
<Person>
    <Name>
        <First> Value </First>
        <Middle> Value </Middle>
        <Last> Value </Last>
    </Name>

<Address>
        <Street> Value </Street>
        <City> Value </City>
        <State> Value </State>
        <ZipCode> Value </ZipCode>
    </Address>
</Person>
```

MECHANISM FOR FACILITATING BACKTRACKING

FIELD OF THE INVENTION

This invention relates generally to computer systems, and more particularly to a mechanism for facilitating backtracking.

BACKGROUND

The XML (extensible Markup Language) specification established by the W3C Organization provides a standardized methodology for exchanging structured data between different mechanisms. The different mechanisms may be different components within the same system (e.g. different program components) or they may be completely separate systems (e.g. systems of different companies, or different servers on the Internet). Basically, XML allows structured data to be exchanged in a textual format using "element tags" to specify structure and to delimit different sets of data.

Figure 1:
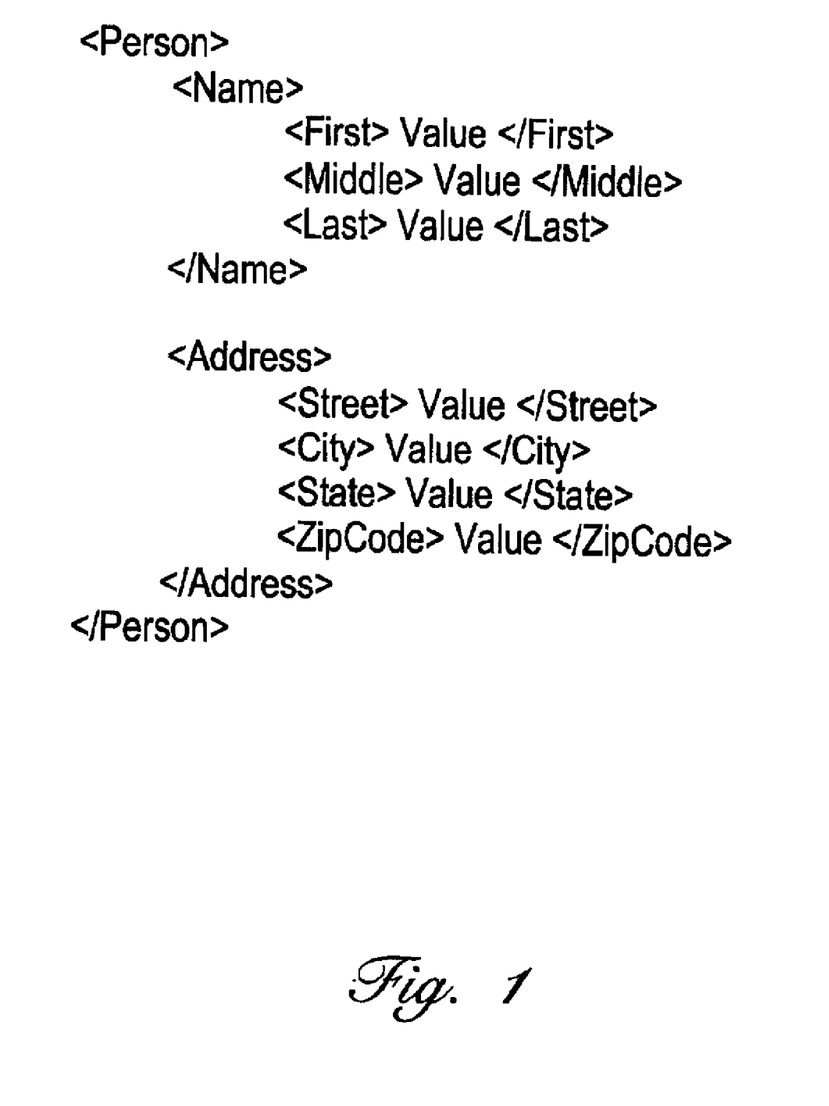
FIG. 1 illustrates a portion of a sample XML document.

An example of a portion of an XML document is shown in FIG. 1. In this example, information about a person is being exchanged. To indicate that the information pertains to a person, the "person" element tags are used to delimit the data. Nested within the "person" element tags are two sets of information: (1) a name; and (2) an address. These sets of information are also delimited using the "Name" and "Address" element tags, respectively. Nested within the "Name" element tags are three child elements, namely, a first, middle, and last name, each of which is delimited by respective element tags, and each of which has an associated value. Likewise, nested within the "Address" element tags are four child elements, namely, a street, city, state, and zip code, each of which is delimited by respective element tags, and each of which has an associated value. By delimiting the sets of data using nested element tags in this manner, the XML document makes it clear how the data is structured, and what each set of data represents. As a result, any mechanism that is capable of understanding the element tags used to delimit the data will be able to interpret and process the data. In this manner, XML makes it possible to exchange structured data in a textual, program-independent, and platform-independent manner. It is this general nature of XML that makes it so flexible and versatile. Because of its versatility, XML has grown significantly in popularity in recent years. The above discussion provides just a brief description of the XML specification. More information on XML may be found on the W3C website at w3c.org. All of the information on that website, as of the filing date of the present application, is incorporated herein by reference.

In some instances, before data in an XML document can be processed or rendered, the XML document first needs to be transformed. For example, if the information of the person shown in FIG. 1 is to be rendered on a cellular phone display, and the cellular phone display does not have enough room for a middle name, then the XML document may first need to be transformed by removing the "middle" name element before the information is provided to the cellular phone to be displayed. As another example, the element tag used in one system may differ from the element tag used in another system. For example, the "person" element tag in one system may correspond to the "employee" element tag in another system. Before the XML document is processed into the other system, the XML document is first transformed to change the "person" element tag to an "employee" element tag. These are examples of simple transformations that can be made to an XML document. Many other more complex transformations may also be made.

To enable an XML document (referred to as a source document) to be transformed into another document (referred to as a result document), there is currently provided a transformation language, known as XSLT (eXtensible stylesheet language transformation). Using XSLT, a transformation document (also referred to as a stylesheet) can be created which, when processed together with the source document, gives rise to the result document. In effect, the transformation document specifies the transformations that need to be made to the source document to derive the result document. For example, the transformation document may specify that whenever a "person" element tag is encountered in the source document, an "employee" element tag should be created in the target document. According to the XSLT specification (which is provided in the W3C website), the transformation document is itself an XML document; thus, it conforms to all of the requirements to which all XML documents conform.

Typically, a transformation document is created by a developer or an end user who wishes to perform a desired set of transformations on one or more source documents. Once developed, the transformation document is provided to a transformation processor, along with one or more source documents, for processing. In response, the transformation processor applies the transformations specified in the transformation document to the elements in the source document to derive a result document. If all goes well, the result document will contain all of the desired transformations and have the exact form that the user desires. This is often not the case, however. Because XSLT is a fairly complex language, users often make mistakes in creating the transformation document. This in turn leads to undesired results in the result document. Typically, a transformation processor provides as output just the result document and no other information. Given only the result document, the source document, and the transformation document, it is very difficult if not almost impossible for a user to determine what part of the transformation document gave rise to the undesired results. As a result, the user does not know what portion or portions of the transformation document to change to correct the problem. As this discussion shows, it is currently very difficult to debug a transformation document. Accordingly, a mechanism for facilitating the debugging process is needed.

SUMMARY OF THE INVENTION

In accordance with one embodiment of the present invention, there is provided a mechanism for facilitating backtracking. As used herein, the term backtracking refers to the ability to determine, after processing is performed, what gave rise to a particular result. For example, in a system with backtracking capability, a user can select a particular portion of a result document, and the system will indicate to the user the particular portions of the source and transformation documents that gave rise to that portion of the result document. With the ability to backtrack, a user can easily determine what caused each portion of the result to be generated. By knowing what caused each portion of the result to be generated, the user can more easily determine what needs to be changed to correct an incorrect result. As a result, backtracking greatly aids in the debugging process.

In one embodiment, backtracking is facilitated by associating a set of history information with each portion of a result. More specifically, in processing a source entity with a transformation entity to derive a result entity, an action set forth in a particular portion of the transformation entity is executed. In one embodiment, a particular portion of the source entity is the subject of this action. When this action is executed, a particular portion of the result entity is generated as a consequence of executing the action. After this portion of the result entity is generated, a set of history information is associated therewith. In one embodiment, this history information comprises a reference to the particular portion of the transformation entity that gave rise to the action, and a reference to the particular portion of the source entity that was the subject of the action. Basically, the history information indicates what portions of the transformation and source entities caused this particular portion of the result entity to be generated. Given this information, it is possible to perform backtracking at a later time.

For example, when this particular portion of the result entity is selected at a later time for backtracking purposes, the history information associated therewith is accessed. From the history information, the references to the particular portions of the transformation and source entities are obtained. Once the references are obtained, it is known what portions of the transformation and source entities gave rise to this particular portion of the result entity. Thus, it is possible to indicate those portions to a user to let the user know what caused this particular portion of the result entity to be generated. In this manner, backtracking may be implemented.

DETAILED DESCRIPTION OF EMBODIMENT(S)

Overview

Figure 2:
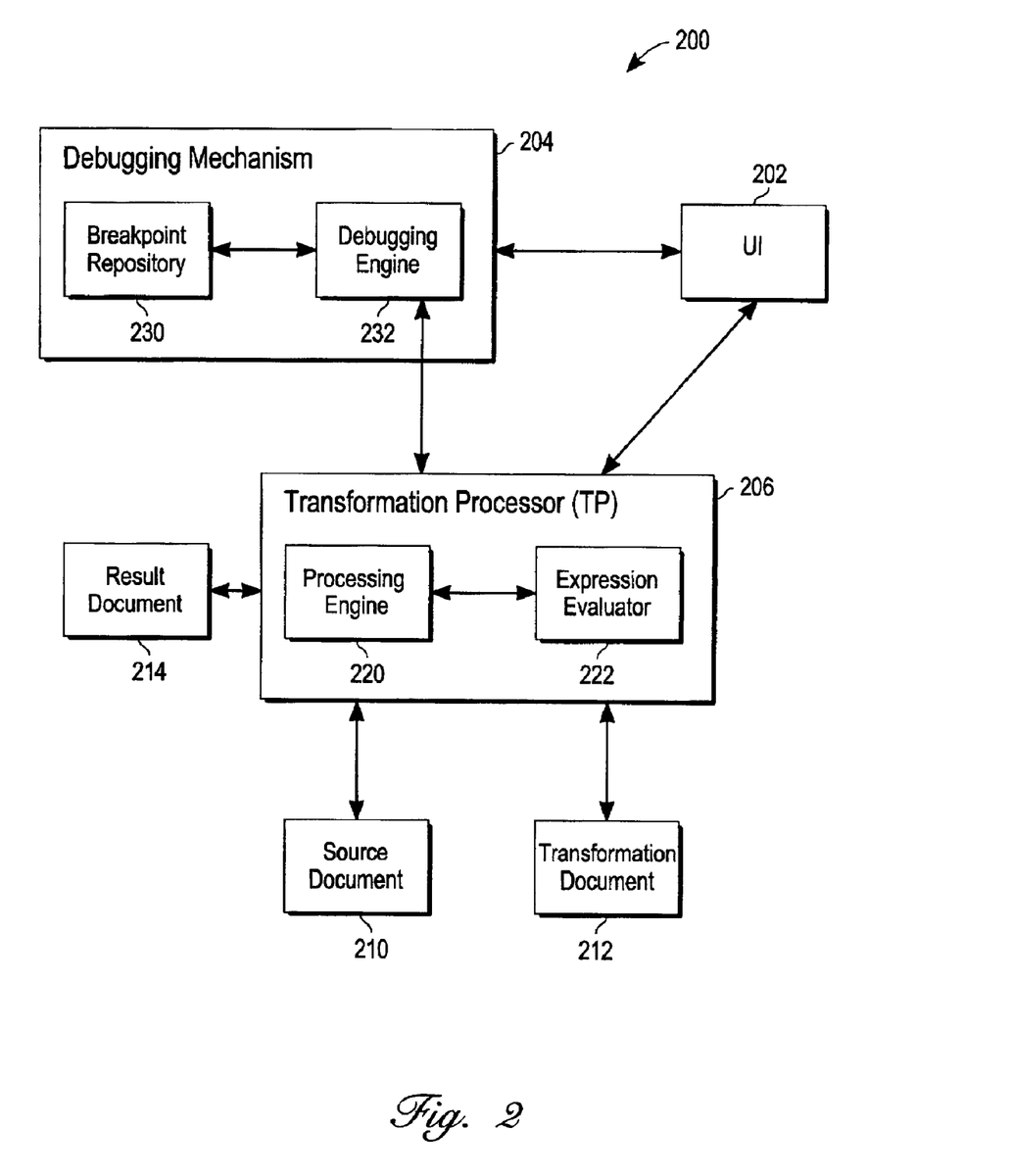
FIG. 2 is a functional block diagram of a system in which one embodiment of the present invention may be implemented.

With reference to FIG. 2, there is shown a functional block diagram of a system 200 in which one embodiment of the present invention may be implemented. As shown, system 200 comprises a user interface (UI) 202, a debugging mechanism 204, and a transformation processor (TP) 206. Together, the various components 202, 204, 206 cooperate to enable a user to carry out various actions, such as setting breakpoints, initiating processing of a source document 210 and a transformation document 212 to derive a result document 214, and viewing intermediate processing results. System 200 makes it simple and convenient for a user to perform transformations and to debug the transformation process. In the following discussion, for illustrative purposes, the present invention will be described in the context of a document transformation process wherein an XML source document 210 is processed with an XSLT transformation document 212 to derive a result document 214. It should be noted, however, that the invention is not so limited. Rather, the invention may be applied generally to any context in which it is desirable to debug a computer process. The computer process need not be a transformation process, and the subjects of the process need not be XML or XSLT documents.

User Interface

The UI 202 provides a mechanism for enabling a user to interact with the other components 204, 206 of the system 200. In one embodiment, UI 202 takes the form of a full-function graphical user interface. It should be noted, though, that for purposes of the present invention, UI 202 may take the form of any type of user interface, including a text-based interface. Using UI 202, a user may perform a number of different functions and operations.

For instance, a user may use UI 202 to view the source document 210, the transformation document 212, and the result document 214. These documents may be displayed in different windows, and may be viewed before, during, and after transformation. While viewing the documents, the user may click on or select various portions of the documents to perform various actions thereon, including possibly editing the documents 210, 212.

The user may also use UI 202 to set breakpoints for debugging purposes. These breakpoints specify to the debugging mechanism 204 when transformation processing should halt to enable the user to view the intermediate results that have been generated up to that point. Being able to halt processing at various breakpoints greatly aids a user in debugging the process. In one embodiment, UI 202 enables the user to set breakpoints in various ways. For example, the user may click on or select a particular location or portion of the source document 210 or transformation document 212 to set a breakpoint at that location. Alternatively, the user may enter a conditional expression that specifies a condition to be satisfied. If the condition is satisfied, then a breakpoint is reached. The user may use these and other ways to specify breakpoints to the system 200. In one embodiment, the UI 202 forwards the breakpoint specifications received from the user to the debugging mechanism 204 for storage in the breakpoint repository 230.

The user may also use UI 202 to set various debugging options. One such option is to implement a breakpoint whenever the debugging mechanism 204 receives an XSL message from the transformation processor 206 (XSL messages are defined in the W3C website). If this option is set, then the debugging mechanism 204 will halt processing whenever an XSL message is received, and give the user an opportunity to terminate or continue processing.

The user may further use UI 202 to initiate processing by the TP 206. In doing so, the user may specify the source document 210 and the transformation document 212 to be processed. The user may also specify various options for governing the transformation process. Which options are available to the user will depend upon the particular TP 206.

In addition, the user may use UI 202 to send instructions to the debugging mechanism. For example, when processing is halted, the user may send a command to the debugging mechanism 204 using UI 202 to continue processing. These and many other actions and operations may be carried out by the user using UI 202.

Transformation Processor

The TP 206 is the component responsible for actually processing a source document 210 with a transformation document 212 to derive a result document 214. In FIG. 2, for the sake of simplicity, only one source document 210 and one transformation document 212 is shown. It should be noted, however, that if so desired, a plurality of transformation documents 212 may be processed with a plurality of source documents 210 to derive the result document 214.

In one embodiment, transformation processing is controlled by the processing engine 220 of TP 206. More specifically, processing engine 212 applies the transformations specified in the transformation document 212 to selected portions of the source document 210 to derive the result document 214. In carrying out the transformation process, the processing engine 220, in one embodiment, breaks the transformations in the transformation document 212 down into a plurality of actions. These actions may differ in granularity depending upon the particular TP 206, but they generally represent actions that need to be performed to carry out the transformation process. In one embodiment, each action has associated with it some context information. This context information indicates the portions of the source document 210 and the transformation document 212 that pertain to the action. More specifically, in one embodiment, the context information indicates the portion of the transformation document 212 that is giving rise to the action, and the portion of the source document 210 that is the subject of the action. After the transformation document 212 is broken down into actions, the actions are executed by the processing engine 220 to process the source 210 and transformation 212 documents to derive the result document 214.

In one embodiment, before executing each action, the processing engine 220 sends a pre-action message to the debugging mechanism 204. Likewise, after executing each action, processing engine 220 sends a post-action message to the debugging mechanism 204. In each of these messages, the processing engine 220 provides an indication of what action is about to be executed or has just been executed. In addition, each message comprises a reference to the set of context information pertaining to the action. After sending each message, processing engine 220 waits for an instruction from the debugging mechanism 204 before proceeding with any further processing. In effect, processing engine 220 halts processing until it is instructed by the debugging mechanism 204 to continue. By doing so, the processing engine 220 gives the debugging mechanism 204 an opportunity to determine whether a breakpoint has been reached, and if so, to halt operation of the processing engine 220. If operation is halted, the results generated up to that point are displayed to the user via UI 202 so that the user can see the intermediate results. Halting processing at strategic breakpoints and displaying intermediate results in this manner greatly aids a user in debugging the transformation process and hence, the transformation document 212.

In addition to sending the pre and post-action messages, the processing engine 220 may also send XSL messages to the debugging mechanism 204. An XSL message is sometimes generated by the processing engine 220 when a particular processing condition is encountered. By sending the XSL message to the debugging mechanism 204, the processing engine 220 grants the debugging mechanism 204 an opportunity to continue processing or to terminate processing.

Debugging Mechanism

The debugging mechanism 204 is the component responsible for enforcing breakpoints. More specifically, in response to each pre-action and post-action message from the processing engine 220, the debugging mechanism 204 determines, based upon information in the breakpoint repository 230 and context information referenced in the message, whether a breakpoint has been reached. If a breakpoint has not been reached, then the debugging mechanism 204 instructs the processing engine 220 to continue with the transformation processing. On the other hand, if a breakpoint has been reached, then the debugging mechanism 204 signals to the UI 202 that a breakpoint has been reached, and waits for further input from the user before instructing the processing engine 220 to proceed. For example, the debugging mechanism 204 may wait for some indication from UI 202 that the user wishes to continue processing before instructing the processing engine 220 to continue. By doing so, the debugging mechanism 204 in effect precludes the processing engine 220 from proceeding, thereby enforcing the breakpoint.

As noted previously, breakpoints are specified by a user using UI 202 and stored in breakpoint repository 230. These breakpoints are later evaluated in light of some context information to determine whether a breakpoint has been reached. In one embodiment, the breakpoints stored in repository 230 are grouped into multiple sets: one set directed to the transformation document 212, and another set directed to the source document 210. Put another way, when a user specifies a breakpoint, the user can specify to which document that breakpoint is directed. This ability to direct a breakpoint to a particular document enhances the user's ability to pinpoint potential trouble spots, which in turn enhances the user's ability to debug the transformation document 212.

Within each set of breakpoints, there may be at least two types of breakpoints: locational and conditional. A locational breakpoint specifies a specific location in a document. Whenever that portion or location of that document is processed, processing should halt. For example, a locational breakpoint may be specified for a particular portion or node of the source document 210 so that whenever that node is processed, processing halts. A conditional breakpoint, in contrast, does not specify a location in a document. Instead, it specifies a condition. If that condition is ever satisfied in that document, processing should halt. Conditional breakpoints provide a very powerful tool for debugging a computer process, especially in situations where the user suspects that a certain condition is causing a problem but has little or no idea where that condition is occurring.

In one embodiment, breakpoints are specified using one or more Xpath expressions. A complete specification of the Xpath expression language is provided on the W3C website. Using Xpath, both a locational and a conditional breakpoint may be specified. For a locational breakpoint, Xpath may be used to specify a complete path, from root node to leaf node, to the location of interest, or from a current context node to a leaf node. For a conditional breakpoint, Xpath may be used to construct a conditional expression. Because Xpath is a rich and powerful language, an almost unlimited set of conditions may be specified. The following are examples of some of the conditions that may be specified using Xpath:

(1) halt when the value of a particular attribute is between 200 and 250;

(2) halt when the name of an element is longer than 4 characters;

(3) halt when: the element "purchase-order" is processed AND it has an attribute named "Order-ID" AND the value of that attribute is 9.

These are relatively simple examples. Other much more complex expressions may be constructed using Xpath. The ability to specify breakpoints using a powerful language such as Xpath greatly enhances the ability of the debugging mechanism 204 to isolate potential trouble spots. It should be noted that Xpath is just one possible expression language. Other expression languages may be used to specify breakpoints without departing from the scope of the present invention.

In one embodiment, the component of the debugging mechanism 204 that is responsible for controlling the breakpoint determination process is the debugging engine 232.

More specifically, the debugging engine 232 receives the pre-action and post-action messages from the processing engine 220. In response to each message, the debugging engine 232 accesses the breakpoints stored in the breakpoint repository 230, and causes the breakpoints to be evaluated in view of the context information referenced in the message to determine whether a breakpoint has been reached. As noted above, in one embodiment, the breakpoints are specified in terms of Xpath expressions. Thus, the process of determining whether a breakpoint has been reached involves the evaluation of Xpath expressions. Some current TP's, such as TP 206, already comprise Xpath expression evaluators 222; thus, rather than redundantly implementing such functionality in the debugging mechanism 204, the debugging engine 232 may invoke expression evaluator 222 of TP 206 to evaluate Xpath expressions.

Accordingly, in one embodiment, when the debugging engine 232 receives a message from the processing engine 220, it extracts from the message the reference to the context information. It then accesses the breakpoints (i.e. the Xpath expressions) stored in the breakpoint repository 230, and selects one of the Xpath expressions. Thereafter, the debugging engine 232 sends the selected Xpath expression, along with the reference to the context information, to the expression evaluator 222 for evaluation. In response, the expression evaluator 222 accesses the context information using the context information reference, and evaluates the Xpath expression in view of the context information to determine whether the Xpath expression is satisfied. In one embodiment, the expression evaluator 222 returns a true or a false. If a true is returned, then it means that the Xpath expression is satisfied by the context information, which in turn means that a breakpoint has been reached. If a false is returned, then it means that this particular breakpoint has not been reached. In one embodiment, the debugging engine 232 continues this process of submitting Xpath expressions to the expression evaluator 222 until either a breakpoint is reached or all breakpoints have been evaluated to false. In this manner, the debugging engine 232 determines, in response to each pre-action and post-action message, whether a breakpoint has been reached.

In addition to receiving pre-action and post-action messages, the debugging engine 232 also receives XSL messages from the processing engine 220. In one embodiment, if the option is set by the user using UI 202, the debugging engine 232 will implement a breakpoint (i.e. cause processing to halt) whenever an XSL message is received. In most TP's, the generation of an XSL message will cause transformation processing to completely terminate. In one embodiment, however, the debugging engine 232 gives the user a choice. If the user so wishes, the debugging engine 232 will instruct the processing engine 220 to continue processing even though an XSL message was received. However, if the user wishes to terminate processing completely, the debugging engine 232 will instruct the processing engine 220 accordingly. By giving the user a choice, debugging engine 232 enhances the user's ability to debug the transformation process.

Noteworthy Aspects

At this point, at least several aspects of the debugging mechanism 204 should be noted. First, note that the debugging process implemented by debugging mechanism 204 is non-intrusive. That is, in setting and implementing breakpoints, it is not necessary to alter the source document 210 or the transformation document 212 in any way. Instead, breakpoints are specified to and implemented by the debugging engine 232 in the course of normal processing of the documents. This is in sharp contrast to prior art debuggers. Typically, to implement a breakpoint in a computer process, prior art debuggers inject a "halt" instruction of some type into the process, which means that either the object code, the source code, or the transformation document needs to be changed. No such change is needed in debugging mechanism 204.

Also, note that debugging mechanism 204 enables a breakpoint to be directed to the source document 210 as well as to the transformation document 212. Previously, it was not possible to set a breakpoint on the source document 210. In addition, because debugging mechanism 204 enables a powerful expression language such as Xpath to be used to specify breakpoints, it greatly enhances the user's ability to set breakpoints, which in turn greatly enhances the user's ability to debug the process. Furthermore, the ability of the debugging mechanism 204 to implement breakpoints on XSL messages and to grant the user the option of continuing processing further enhances the user's ability to debug the process. These and other aspects of debugging mechanism 204 render it superior to prior art debugging systems.

Operation of Debugging Engine

Figure 3:
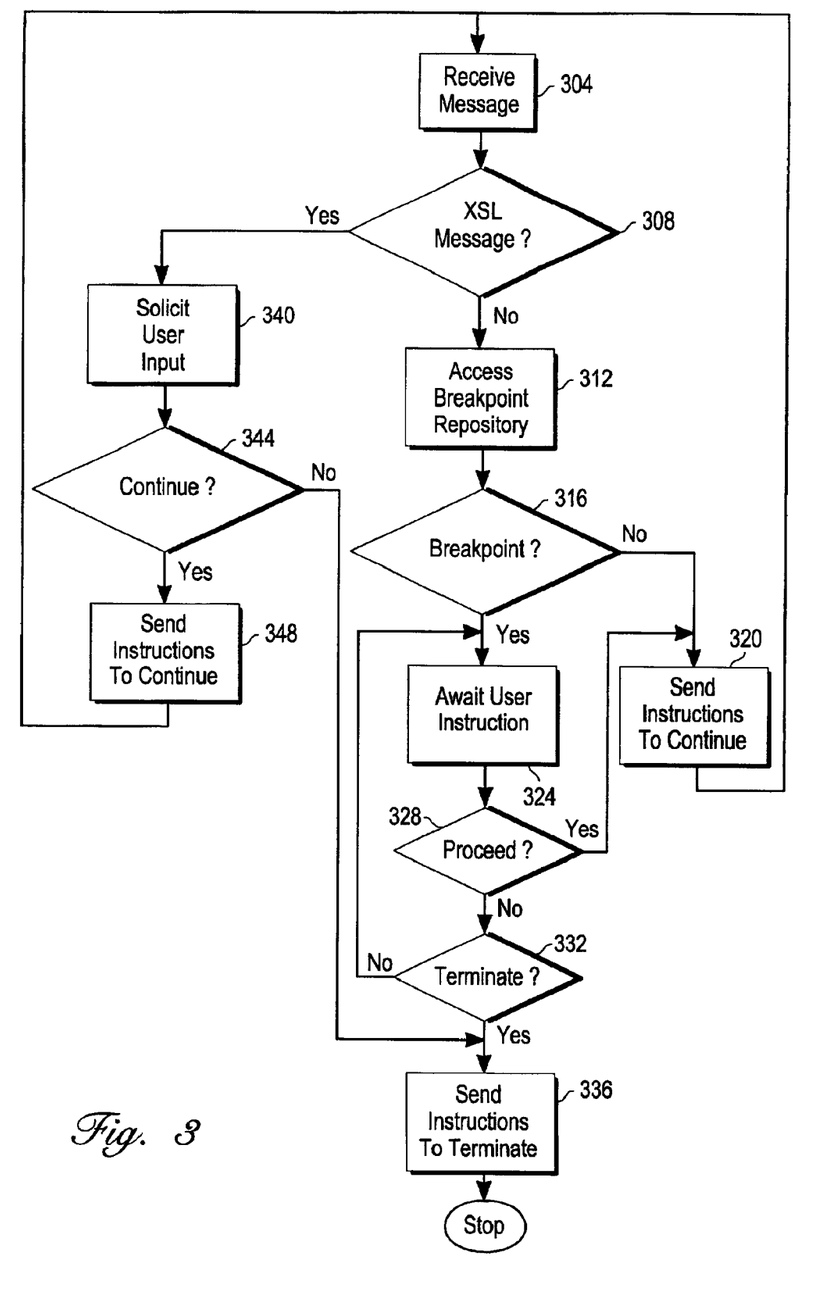
FIG. 3 is an operational flow diagram for one embodiment of the debugging engine of FIG. 2.

With reference to the flow diagram of FIG. 3, the operation of one embodiment of the debugging mechanism 204 will now be described in detail. By the time the functionality of the debugging mechanism 204 is invoked, it is assumed that the user has already used UI 202 to specify and store some breakpoint specifications into the breakpoint repository 230. It is also assumed that the user has used UI 202 to invoke the TP 206 to begin processing of the source document 210 and the transformation document 212. In the following discussion, it is further assumed that the user has selected the option of implementing a breakpoint in response to XSL messages.

Initially, the debugging engine 232 of the debugging mechanism 204 operates by monitoring for incoming messages from the processing engine 220. When a message is received (304), the debugging engine 232 processes the message to determine (308) what type of message it is. If the message is an XSL message, then the debugging engine 232 proceeds to solicit (340) input from the user. More specifically, the debugging engine 232 asks the user whether the user wishes to continue processing or to terminate processing. When user input is received, the debugging mechanism 232 determines (344) whether the user wishes to continue processing. If not, the debugging engine sends (336) an instruction to the processing engine 220 to terminate processing. Thereafter, the debugging engine 232 stops operation. On the other hand, if the debugging engine 232 determines that the user wishes to continue processing, then it sends (348) an instruction to the processing engine 220 to continue with the transformation process. Thereafter, the debugging engine 232 loops back to (304) to monitor for and receive another message.

Returning to (308), if the debugging engine 232 determines that the message is not an XSL message (thereby meaning that it is either a pre-action or a post-action message), then it proceeds to access (312) the breakpoint specifications stored in the breakpoint repository 230. Using the breakpoint specifications and the context information reference contained in the message, the debugging engine 232 determines (316) whether a breakpoint has been reached. In one embodiment, the debugging engine 232 implements the breakpoint determination process as follows.

Initially, the debugging engine 232 extracts from the message the reference to the context information. In one embodiment, each pre-action and post-action message comprises two context information references: one reference indicating the portion of the transformation document 212 that is giving rise to the action in the message, and another reference indicating the portion of the source document 210 that is the subject of the action. After extracting the context information references from the message, the debugging engine 232, in one embodiment, selects the reference indicating the portion of the transformation document 212 that is giving rise to the action. It then selects the set of breakpoint specifications in the breakpoint repository 230 that is associated with the transformation document 212 (recall that the breakpoint specifications in the breakpoint repository 230 are separated into two sets: one set directed to the transformation document 212, and another set directed to the source document 210). Thereafter, the debugging engine 232 tests each of the breakpoint specifications in the selected set against the selected referenced context information to determine whether a breakpoint has been reached. In effect, the debugging engine 232 is determining whether any of the breakpoints directed to the transformation document 212 has been reached.

To do so, the debugging engine 232 initially selects one of the breakpoint specifications (i.e. one of the Xpath expressions) in the selected set. It then sends the selected Xpath expression, along with the reference to the context information, to the expression evaluator 222 for evaluation. If the expression evaluator 222 returns true, then it means that the context information satisfies the Xpath expression, thereby meaning that a breakpoint has been reached. If the expression evaluator 222 returns false, then it means that this particular breakpoint has not been reached. If a false is returned, the debugging engine 232 selects another Xpath expression in the selected set, and sends that expression, along with the reference to the context information, to the expression evaluator 222 for evaluation. The debugging engine 232 continues this process until either a breakpoint is reached or all breakpoints in the selected set have been evaluated to false. If all breakpoints in the selected set are evaluated to false, then it means that none of the breakpoints directed to the transformation document 212 were reached.

In such a case, the debugging engine 232 proceeds to determine whether any of the breakpoints directed to the source document 210 have been reached. To do so, the debugging mechanism 232 selects the reference indicating the portion of the source document 210 that is the subject of the action. It then selects the set of breakpoint specifications in the breakpoint repository 230 that is associated with the source document 210. Thereafter, the debugging engine 232 tests each of these breakpoint specifications against the selected referenced context information to determine whether a breakpoint has been reached. The testing of each of these breakpoints is carried out by invoking the expression evaluator 222 in the same manner as that described above. By the end of this process, the debugging engine 232 will know whether any of the breakpoints in the breakpoint repository 230 has been reached.

Returning to (316), if no breakpoint is reached, then the debugging engine 232 sends (320) an instruction to the processing engine 220 to continue processing. Thereafter, the debugging engine 232 loops back to (304) to monitor for and receive another message. On the other hand, if any breakpoint is reached, then the debugging engine 232 sends a signal to the UI 202 indicating that a breakpoint has been reached, and waits (324) for further user instruction. By not immediately sending an instruction to the processing engine 220 to continue, the debugging engine 232 in effect halts processing, thereby giving the user an opportunity to review the intermediate results that have been generated up to that point. In one embodiment, when a breakpoint is reached, the UI 202 shows the user the results that have been generated up to that point. In addition, the UI 202 indicates to the user the portion of the source document 210 and the portion of the transformation document 212 that caused the breakpoint to be reached. That way, the user can see what portions of the source and transformation documents caused the result to be generated.

When user input is received, the debugging engine 232 determines (328) whether the user wishes to proceed with processing. If so, the debugging engine 232 sends (320) an instruction to the processing engine 220 to continue processing, and loops back to (304) to monitor for and receive another message. If the user input is not an instruction to proceed, the debugging engine 232 determines (332) whether it is an instruction to terminate processing. If not, the debugging engine 232 loops back to (324) to await further user instruction. If it is an instruction to terminate processing, then the debugging engine 232 sends (336) an instruction to the processing engine 220 to terminate processing, and thereafter stops operation. In the manner described, the debugging engine 232 implements breakpoints in the transformation process.

Operation of Transformation Processor

Figure 4:
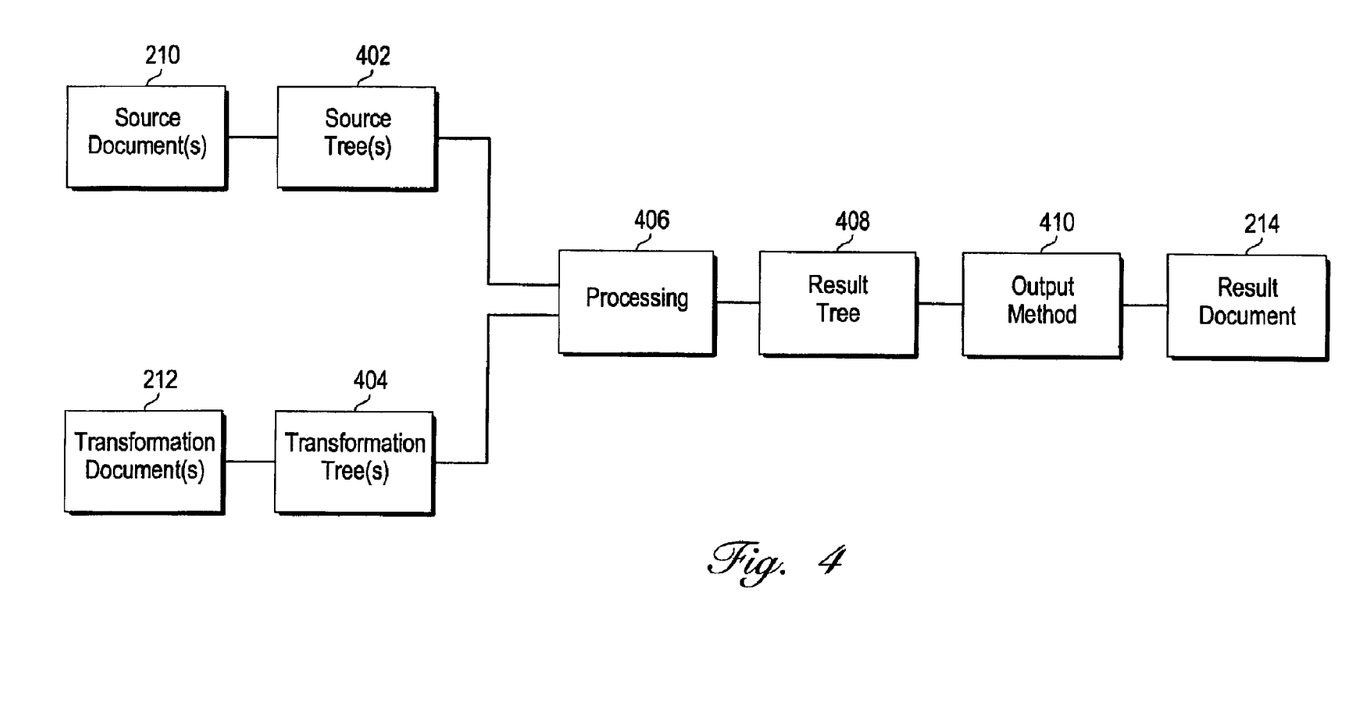
FIG. 4 is a functional overview of the operation of one embodiment of the transaction processor of FIG. 2.

With reference to FIG. 4, there is shown an operational overview of one embodiment of the TP 206. As shown, TP 206 receives as input at least one source document 210 and at least one transformation document 212. These documents 210, 212 are parsed and modeled as tree representations 402, 404. More specifically, the source document 210 is modeled as source tree 402, and the transformation document 212 is modeled as transformation tree 404.

After the documents 210, 212 are modeled as trees, the tree representations 402, 404 are processed 406 to derive a result tree 408, which is the tree representation of the result of the transformation process. Thereafter, an output method 410 is applied to the result tree 408 to derive the result document 214. Depending upon the output method 410, the result document 214 may take on one of various different forms. For example, the output method 410 may generate a result document 214 that is in html format, XML format, text format, or any other desired format. Once derived, the result document 214 may be displayed by the UI 202 to enable the user to review the document 214 for accuracy. In one embodiment, the TP 206 provides to the UI 202 information pertaining to all of the documents 210, 212, 214, including the documents themselves and the corresponding tree representations 402, 402, and 408. Thus, the user can use UI 202 to view any or all of these items before, during, and after the transformation process.

Source Tree

As noted previously, in one embodiment, the source document 210 is an XML document, and like most XML documents, takes the form of a text document comprising one or more element tags and one or more data sets. As shown in the sample XML document of FIG. 1, the element tags may be nested within other element tags to give rise to a hierarchical structure, which defines the structural relationships between the various elements and sets of data. Because they specify a hierarchical structure, XML documents lend themselves to being represented by tree-type representations. In fact, as shown in FIG. 4, many XML documents are not processed directly but rather are first parsed and transformed into tree representations, and then processed using the tree representations.

An XML document may be represented using any type of tree structure, but one tree structure that is commonly used for transformation processing purposes is the Xpath object model. According to this object model, an XML document is represented as an object tree with a plurality of nodes. Each node corresponds to an item in the XML document, and is related to other nodes in accordance with the hierarchy set forth in the XML document. The Xpath object model provides a rich tree representation for the XML document. Given any node on the tree, the Xpath tree representation provides all information pertinent to that node. For example, the Xpath tree representation provides information as to which node is the parent of that node, which nodes are children of that node, which nodes are siblings of that node, what path may be taken to access that node, as well as other information. Given this tree representation, it is easy to obtain, given a reference to a node, all of the information pertinent to that node. As will be discussed in greater detail below, this information about a node is, in one embodiment, the context information that is used by the expression evaluator 222 to determine whether an Xpath expression is satisfied. This is a very brief description of the Xpath object model. More information and a specification for the object model can be found on the W3C website.

Transformation Tree

Like the source document 210, the transformation document 212, in one embodiment, is also an XML document. Thus, it likewise can be parsed and represented as a tree 404 using the Xpath object model. However, because it is a transformation document, it takes some additional processing.

In one embodiment, the transformation document 212 takes the form of a document written in the XSLT language. In large part, an XSLT document comprises one or more templates. Each template generally comprises two parts: (1) a triggering pattern specification; and (2) one or more actions. The triggering pattern specifies what structural pattern in a source document will cause the template to be triggered or invoked. If the source document 210 has the structural pattern specified in the triggering pattern of a template, then the TP 206 will invoke that template when the triggering pattern is encountered in the source document. When a template is invoked, the actions specified in that template are performed by the TP 206.

In generating the transformation tree 404 and preparing the transformation document 212 for processing, a number of operations are carried out. Initially, the transformation document 212 is scanned to find all of the templates in the transformation document 212. Once found, the templates are sorted based upon their triggering pattern specifications. Thereafter, the actions for each template are determined and parsed out. As these operations are performed, the transformation tree 404 is constructed to include a node for each item in the transformation document 212. Thus, nodes for such items as templates and actions are constructed in the transformation tree 404. Each node is related to other nodes in accordance with the hierarchy specified in the transformation document 212. In one embodiment, the transformation tree 404 is constructed using the Xpath object model. Thus, like the source tree 402, each node in the transformation tree 404 contains sufficient information to enable all of the information pertinent to that node to be ascertained. After the transformation tree 404 is constructed, it is ready to be processed with one or more source trees 402 to carry out the transformation process.

Transformation Processing

In implementing the transformation process, the TP 206 applies the actions in the transformation tree 404 to select nodes in the source tree 402. For each action that is to be executed, the TP 206 determines which node or ordered set of nodes in the source tree 402 is to be the subject of that action. The action is then executed using that node as the context node. At this point, it should be noted that, in one embodiment, each action has associated with it at least two sets of context information. The first set of context information relates to the transformation tree 404, and more specifically to the node in the transformation tree 404 that is giving rise to the action. As disclosed previously, each action is represented by a node in the transformation tree 404. Thus, the first set of context information for an action is the node in the transformation tree 404 that corresponds to that action. The second set of context information relates to the source tree 402, and more specifically to the node in the source tree 402 that is the subject of the action. Basically, the second set of context information indicates which node in the source tree 402 the action is being performed upon. The TP 206 uses this context information to guide it in carrying out the transformation process.

As noted previously, before the TP 206 executes each action, it sends a pre-action message to the debugging mechanism 204. Likewise, after it executes each action, the TP 206 sends a post-action message to the debugging mechanism 204. In each of these messages, the TP 206 provides certain sets of information. In one embodiment, these sets of information include: (1) an indication as to the action that is to be or has just been performed; (2) a reference to the first set of context information (e.g. a pointer to the node in the transformation tree 404 that corresponds to the action); and (3) a reference to the second set of context information (e.g. a pointer to the node in the source tree 402 that is the subject of the action). After sending these messages, the TP 206 waits for further instruction from the debugging mechanism 204 before proceeding. If the debugging mechanism 204 instructs the TP 206 to continue processing, then the TP 206 will proceed with the transformation process. If the debugging mechanism 204 instructs the TP 206 to terminate processing, it will do that as well.

As discussed previously, in determining whether a breakpoint has been reached, the debugging mechanism 204 invokes the expression evaluator 222 of the TP 206 to determine whether an Xpath expression is satisfied. When making such an invocation, the debugging mechanism 204 provides an Xpath expression and a reference to a set of context information (the context information may be the first set or the second set of context information). In response, the expression evaluator 222 uses the reference to access the set of context information. For example, if the reference is a pointer to a node in the source tree 402 that is the subject of an action, the expression evaluator 222 uses that pointer to access the node. Once the node is accessed, the expression evaluator 222 can obtain all of the information pertinent to that node. Based upon that information, the expression evaluator 222 can determine whether the Xpath expression is satisfied.

In the course of carrying out the transformation process, the TP 206 will at some point execute an action that causes a node to be created in the result tree 408. When such a result tree node is created, the TP 206 stores within that node the same types of information as that stored in the nodes of the source tree 402 and transformation tree 404. In one embodiment, in addition to such information, the TP 206 also stores information indicating the nodes in the source tree 402 and transformation tree 404 that caused the result tree node to be created. For example, if node A of transformation tree 404 gave rise to the action that created the result tree node, and node B of the source tree 402 was the subject of the action, then references (e.g. pointers) to nodes A and B will be stored in the result tree node. By doing so, the TP 206 in effect stores history information into each result tree node. This history information can be used advantageously for a variety of purposes.

Backtracking

One of the possible uses of the history information is to enable backtracking to be performed. As used herein, backtracking refers to the ability to ascertain, after transformation processing has been performed, what portions of the source and transformation documents 210, 212 gave rise to what portion of the result document 214 or the result tree 408. To illustrate how the history information can be used to perform backtracking, reference will be made to an example.

Suppose the following: (1) TP 206 has completely processed source document 210 and transformation document 212 to derive result tree 408 and result document 214; (2) TP 206 has constructed the result tree 408 in the manner described above, complete with history information in each result tree node; (3) the UI 202 is currently displaying the source document 210, the transformation document 212, and the result document 214 to the user; and (4) the user selects a portion of the result document 214 to find out what portions of the source document 210 and transformation document 212 gave rise to that portion of the result document 214.

As noted previously, the TP 206 provides all of the information pertaining to the documents 210, 212, 214 to the UI 202. Thus, the UI 202 has access to all of the documents 210, 212, 214 and all of the tree representations 402, 404, 408 for all of the documents. That being the case, when the user selects a portion of the result document 214, the UI 202 associates that portion with a node in the result tree 408. The UI 202 then accesses that result tree node to extract the history information therefrom. Because the history information comprises references to the nodes in the transformation tree 404 and the source tree 402 that gave rise to the result tree node, the UI 202 can access those nodes. After the appropriate nodes in the source and transformation trees 402, 404 are accessed, the UI 202 associates the nodes with the corresponding portions of the source and transformation documents 210, 212. In this manner, given a selected portion of the result document 214, the UI 202 can determine which portions of the source and transformation documents 210, 212 gave rise to the selected portion. Once determined, the portions of the source and transformation documents 210, 212 can be specially displayed (e.g. highlighted) to the user so that the user can see which portions of the documents 210, 212 gave rise to the selected portion of the result document 214. In one embodiment, the user can arbitrarily select any portion of the result document 214. In response, the UI 202 will show the user what portions of the source and transformation documents 210, 212 gave rise to the selected portion.

Thus far, the backtracking capability has been described with reference to selecting a portion of the result document 214. It should be noted though that, if so desired, backtracking may be implemented using the result tree 408 instead. That is, the UI 202 may show the user the result tree 408, and allow the user to select a node on the tree 408. In response, the UI 202 may show the user the portions of the source and transformation documents 210, 212 that gave rise to that node. Alternatively, the UI 202 may show the user the source tree 402 and transformation tree 404, and highlight the nodes of those trees that gave rise to the selected node of the result tree 408. These and other ways of manifesting backtracking to the user may be implemented. In the manner described, TP 206 and UI 202 cooperate to enable backtracking to be implemented. This backtracking capability is a powerful tool for debugging a computer process.

Hardware Overview

Figure 5:
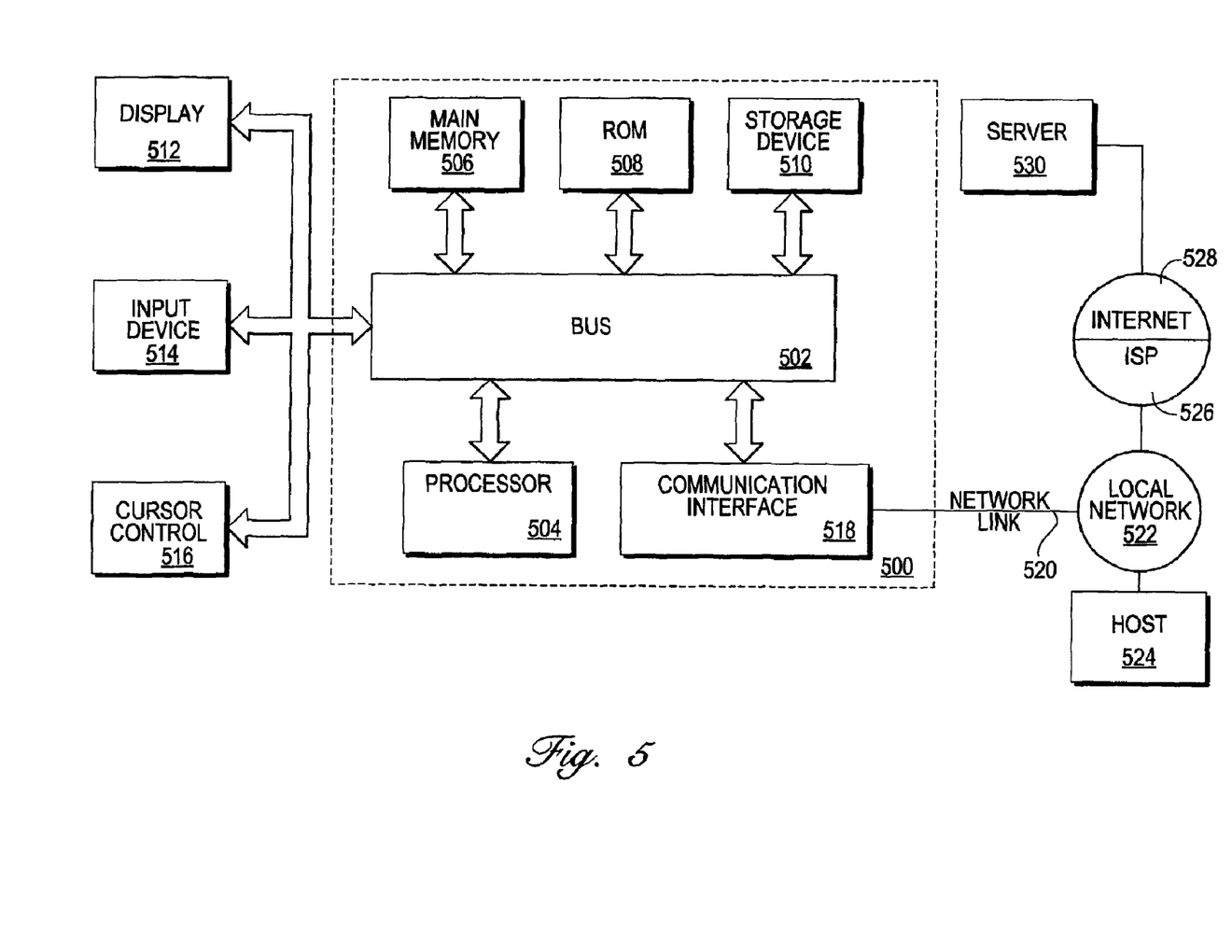
FIG. 5 is a hardware block diagram of a computer system in which one embodiment of the present invention may be implemented.

In one embodiment, the various components 202, 204, 206 of the present invention are implemented as sets of instructions executable by one or more processors. The invention may be implemented as part of an object oriented programming system, including but not limited to the JAVA™ programming system manufactured by Sun Microsystems, Inc. of Palo Alto, Calif. FIG. 5 shows a hardware block diagram of a computer system 500 in which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 may also be further used to store temporary variables or other intermediate information during execution of instructions by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 maybe coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

According to one embodiment, the functionality of the present invention is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. In this manner, computer system 500 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A computer-implemented method for processing a source entity with a transformation entity to derive a result entity, comprising:

executing an action set forth in a particular portion of said transformation entity, a particular portion of said source entity being a subject of said action;

generating a particular portion of said result entity as a consequence of executing said action; and associating a set of history information with said particular portion of said result entity, said history information comprising a reference to said particular portion of said transformation entity and a reference to said particular portion of said source entity to indicate that said particular portions of said transformation entity and said source entity gave rise to said particular portion of said result entity.

2. The method of claim 1, wherein said result entity comprises a result tree representation, and wherein said particular portion of said result entity comprises a particular node in said result tree representation.

3. The method of claim 2, wherein associating said set of history information with said particular portion of said result entity comprises:

storing said history information in said particular node of said result tree representation.

4. The method of claim 2, further comprising:

displaying said result tree representation to a user.

5. The method of claim 2, further comprising:

applying an output method to said result tree representation to derive a result document, said result document comprising a particular portion which corresponds to said particular node of said result tree representation; and displaying said result document to a user.

6. The method of claim 2, further comprising:

receiving an indication that said particular node in said result tree representation has been selected;

accessing said history information in response to receiving said indication;

obtaining from said history information said reference to said particular portion of said transformation entity and said reference to said particular portion of said source entity; and providing an indication that said particular portion of said transformation entity and said particular portion of said source entity gave rise to said particular node in said result tree representation.

7. The method of claim 6, wherein providing said indication comprises:

displaying said particular portion of said transformation entity and said particular portion of said source entity.

8. The method of claim 6, wherein providing said indication comprises:

displaying said transformation entity and said source entity;

displaying said particular portion of said transformation entity in a different manner than other portions of said transformation entity; and displaying said particular portion of said source entity in a different manner than other portions of said source entity.

9. The method of claim 1, wherein said source entity comprises a source tree representation, wherein said transformation entity comprises a transformation tree representation, wherein said reference to said particular portion of said source entity comprises a reference to a particular node in said source tree representation, and wherein said reference to said particular portion of said transformation entity comprises a reference to a particular node in said transformation tree representation.

10. The method of claim 9, further comprising:

receiving an indication that said particular portion of said result entity has been selected;

accessing said history information in response to receiving said indication;

obtaining from said history information said reference to said particular node of said transformation tree representation and said reference to said particular node of said source tree representation; and providing an indication that said particular node of said transformation tree representation and said particular node of said source tree representation gave rise to said particular portion of said result entity.

11. The method of claim 10, wherein providing said indication comprises:

displaying said particular node said transformation tree representation and said particular node of said source tree representation.

12. The method of claim 10, wherein providing said indication comprises:

displaying said transformation tree representation and said source tree representation;

displaying said particular node of said transformation tree representation in a different manner than other node of said transformation tree representation; and displaying said particular node of said source tree representation in a different manner than other nodes of said source tree representation.

13. The method of claim 10, wherein said source entity further comprises a source document, wherein said transformation entity further comprises a transformation document, wherein said source document comprises a particular portion which corresponds to said particular node in said source tree representation, wherein said transformation document comprises a particular portion which corresponds to said particular node in said transformation tree representation, and wherein providing said indication comprises:

displaying said particular portion of said transformation document and said particular portion of said source document.

14. The method of claim 10, wherein said source entity further comprises a source document, wherein said transformation entity further comprises a transformation document, wherein said source document comprises a particular portion which corresponds to said particular node in said source tree representation, wherein said transformation document comprises a particular portion which corresponds to said particular node in said transformation tree representation, and wherein providing said indication comprises:

displaying said transformation document and said source document;

displaying said particular portion of said transformation document in a different manner than other portions of said transformation document; and displaying said particular portion of said source document in a different manner than other portions of said source document.

15. The method of claim 1, wherein said source entity comprises an XML (eXtensible markup language) document, and said transformation entity comprises a stylesheet.

16. An apparatus for processing a source entity with a transformation entity to derive a result entity, comprising:

a mechanism for executing an action set forth in a particular portion of said transformation entity, a particular portion of said source entity being a subject of said action;

a mechanism for generating a particular portion of said result entity as a consequence of executing said action; and a mechanism for associating a set of history information with said particular portion of said result entity, said history information comprising a reference to said particular portion of said transformation entity and a reference to said particular portion of said source entity to indicate that said particular portions of said transformation entity and said source entity gave rise to said particular portion of said result entity.

17. The apparatus of claim 16, wherein said result entity comprises a result tree representation, and wherein said particular portion of said result entity comprises a particular node in said result tree representation.

18. The apparatus of claim 17, wherein the mechanism for associating said set of history information with said particular portion of said result entity comprises:

a mechanism for storing said history information in said particular node of said result tree representation.

19. The apparatus of claim 17, further comprising:

a mechanism for displaying said result tree representation to a user.

20. The apparatus of claim 17, further comprising:

a mechanism for applying an output method to said result tree representation to derive a result document, said result document comprising a particular portion which corresponds to said particular node of said result tree representation; and a mechanism for displaying said result document to a user.

21. The apparatus of claim 17, further comprising:

a mechanism for receiving an indication that said particular node in said result tree representation has been selected;

a mechanism for accessing said history information in response to receiving said indication;

a mechanism for obtaining from said history information said reference to said particular portion of said transformation entity and said reference to said particular portion of said source entity; and a mechanism for providing an indication that said particular portion of said transformation entity and said particular portion of said source entity gave rise to said particular node in said result tree representation.

22. The apparatus of claim 21, wherein the mechanism for providing said indication comprises:
a mechanism for displaying said particular portion of said transformation entity and said particular portion of said source entity.

23. The apparatus of claim 21, wherein the mechanism for providing said indication comprises:
a mechanism for displaying said transformation entity and said source entity;
a mechanism for displaying said particular portion of said transformation entity in a different manner than other portions of said transformation entity; and
a mechanism for displaying said particular portion of said source entity in a different manner than other portions of said source entity.

24. The apparatus of claim 16, wherein said source entity comprises a source tree representation, wherein said transformation entity comprises a transformation tree representation, wherein said reference to said particular portion of said source entity comprises a reference to a particular node in said source tree representation, and wherein said reference to said particular portion of said transformation entity comprises a reference to a particular node in said transformation tree representation.

25. The apparatus of claim 24, further comprising:
a mechanism for receiving an indication that said particular portion of said result entity has been selected;
a mechanism for accessing said history information in response to receiving said indication;
a mechanism for obtaining from said history information said reference to said particular node of said transformation tree representation and said reference to said particular node of said source tree representation; and
a mechanism for providing an indication that said particular node of said transformation tree representation and said particular node of said source tree representation gave rise to said particular portion of said result entity.

26. The apparatus of claim 25, wherein the mechanism for providing said indication comprises:
a mechanism for displaying said particular node of said transformation tree representation and said particular node of said source tree representation.

27. The apparatus of claim 25, wherein the mechanism for providing said indication comprises:
a mechanism for displaying said transformation tree representation and said source tree representation;
a mechanism for displaying said particular node of said transformation tree representation in a different manner than other node of said transformation tree representation; and
a mechanism for displaying said particular node of said source tree representation in a different manner than other nodes of said source tree representation.

28. The apparatus of claim 25, wherein said source entity further comprises a source document, wherein said transformation entity further comprises a transformation document, wherein said source document comprises a particular portion which corresponds to said particular node in said source tree representation, wherein said transformation document comprises a particular portion which corresponds to said particular node in said transformation tree representation, and wherein the mechanism for providing said indication comprises:
a mechanism for displaying said particular portion of said transformation document and said particular portion of said source document.

29. The apparatus of claim 25, wherein said source entity further comprises a source document, wherein said transformation entity further comprises a transformation document, wherein said source document comprises a particular portion which corresponds to said particular node in said source tree representation, wherein said transformation document comprises a particular portion which corresponds to said particular node in said transformation tree representation, and wherein the mechanism for providing said indication comprises:
a mechanism for displaying said transformation document and said source document;
a mechanism for displaying said particular portion of said transformation document in a different manner than other portions of said transformation document; and
a mechanism for displaying said particular portion of said source document in a different manner than other portions of said source document.

30. The apparatus of claim 16, wherein said source entity comprises an XML (eXtensible markup language) document, and said transformation entity comprises a stylesheet.

31. A computer readable medium comprising instructions which, when executed by one or more processors, cause the one or more processors to process a source entity with a transformation entity to derive a result entity, said computer readable medium comprising:
instructions for causing one or more processors to execute an action set forth in a particular portion of said transformation entity, a particular portion of said source entity being a subject of said action;
instructions for causing one or more processors to generate a particular portion of said result entity as a consequence of executing said action; and
instructions for causing one or more processors to associate a set of history information with said particular portion of said result entity, said history information comprising a reference to said particular portion of said transformation entity and a reference to said particular portion of said source entity to indicate that said particular portions of said transformation entity and said source entity gave rise to said particular portion of said result entity.

32. The computer readable medium of claim 31, wherein said result entity comprises a result tree representation, and wherein said particular portion of said result entity comprises a particular node in said result tree representation.

33. The computer readable medium of claim 32, wherein the instructions for causing one or more processors to associate said set of history information with said particular portion of said result entity comprises:
instructions for causing one or more processors to store said history information in said particular node of said result tree representation.

34. The computer readable medium of claim 32, further comprising:
instructions for causing one or more processors to display said result tree representation to a user.

35. The computer readable medium of claim 32, further comprising:
instructions for causing one or more processors to apply an output method to said result tree representation to derive a result document; said result document comprising a particular portion which corresponds to said particular node of said result tree representation; and
instructions for causing one or more processors to display said result document to a user.

36. The computer readable medium of claim 32, further comprising:
- instructions for causing one or more processors to receive an indication that said particular node in said result tree representation has been selected;
- instructions for causing one or more processors to access said history information in response to receiving said indication;
- instructions for causing one or more processors to obtain from said history information said reference to said particular portion of said transformation entity and said reference to said particular portion of said source entity; and
- instructions for causing one or more processors to provide an indication that said particular portion of said transformation entity and said particular portion of said source entity gave rise to said particular node in said result tree representation.

37. The computer readable medium of claim 36, wherein the
- instructions for causing one or more processors to provide said indication comprises:
- instructions for causing one or more processors to display said particular portion of said transformation entity and said particular portion of said source entity.

38. The computer readable medium of claim 36, wherein the instructions for causing one or more processors to provide said indication comprises:
- instructions for causing one or more processors to display said transformation entity and said source entity;
- instructions for causing one or more processors to display said particular portion of said transformation entity in a different manner than other portions of said transformation entity; and
- instructions for causing one or more processors to display said particular portion of said source entity in a different manner than other portions of said source entity.

39. The computer readable medium of claim 31, wherein said source entity comprises a source tree representation, wherein said transformation entity comprises a transformation tree representation, wherein said reference to said particular portion of said source entity comprises a reference to a particular node in said source tree representation, and wherein said reference to said particular portion of said transformation entity comprises a reference to a particular node in said transformation tree representation.

40. The computer readable medium of claim 39, further comprising:
- instructions for causing one or more processors to receive an indication that said particular portion of said result entity has been selected;
- instructions for causing one or more processors to access said history information in response to receiving said indication;
- instructions for causing one or more processors to obtain from said history information said reference to said particular node of said transformation tree representation and said reference to said particular node of said source tree representation; and
- instructions for causing one or more processors to provide an indication that said particular node of said transformation tree representation and said particular node of said source tree representation gave rise to said particular portion of said result entity.

41. The computer readable medium of claim 40, wherein the instructions for causing one or more processors to provide said indication comprises:
- instructions for causing one or more processors to display said particular node of said transformation tree representation and said particular node of said source tree representation.

42. The computer readable medium of claim 40, wherein the instructions for causing one or more processors to provide said indication comprises:
- instructions for causing one or more processors to display said transformation tree representation and said source tree representation;
- instructions for causing one or more processors to display said particular node of said transformation tree representation in a different manner than other node of said transformation tree representation; and
- instructions for causing one or more processors to display said particular node of said source tree representation in a different manner than other nodes of said source tree representation.

43. The computer readable medium of claim 40, wherein said source entity further comprises a source document, wherein said transformation entity further comprises a transformation document, wherein said source document comprises a particular portion which corresponds to said particular node in said source tree representation, wherein said transformation document comprises a particular portion which corresponds to said particular node in said transformation tree representation, and wherein the instructions for causing one or more processors to provide said indication comprises:
- instructions for causing one or more processors to display said particular portion of said transformation document and said particular portion of said source document.

44. The computer readable medium of claim 40, wherein said source entity further comprises a source document, wherein said transformation entity further comprises a transformation document, wherein said source document comprises a particular portion which corresponds to said particular node in said source tree representation, wherein said transformation document comprises a particular portion which corresponds to said particular node in said transformation tree representation, and wherein the instructions for causing one or more processors to provide said indication comprises:
- instructions for causing one or more processors to display said transformation document and said source document;
- instructions for causing one or more processors to display said particular portion of said transformation document in a different manner than other portions of said transformation document; and
- instructions for causing one or more processors to display said particular portion of said source document in a different manner than other portions of said source document.

45. The computer readable medium of claim 31, wherein said source entity comprises an XML (eXtensible markup language) document, and said transformation entity comprises a stylesheet.

* * * * *